(No Model.) 2 Sheets—Sheet 2.

F. B. FLYNN.
OIL DRIP PAN.

No. 496,403. Patented May 2, 1893.

Witnesses:
George L. Cragg
George McMahon

Inventor:
Frank B. Flynn
By Barton & Brown
Attys

UNITED STATES PATENT OFFICE.

FRANK B. FLYNN, OF CHICAGO, ILLINOIS.

OIL-DRIP PAN.

SPECIFICATION forming part of Letters Patent No. 496,403, dated May 2, 1893.

Application filed November 22, 1892. Serial No. 452,771. (No model.)

*To all whom it may concern:*

Be it known that I, FRANK B. FLYNN, a citizen of the United States, residing at Chicago, in the county of Cook and State of Illinois, have invented a certain new and useful Improvement in Oil-Pans, (Case No. 1,) of which the following is a full, clear, concise, and exact description, reference being had to the accompanying drawings, forming a part of this specification.

My invention relates to pans for catching oil.

It has for its object the construction of a pan which will prevent the oil which drips or is thrown from the bearings of pulleys from working its way to the belts.

Machine oil has a destructive effect upon belts. It makes them slippery and liable to fly off the pulleys, and as the tenacity of the belts upon the pulleys decreases as their saturation with oil increases, the tension of the belts must be increased, which causes increased friction upon the bearings. To prevent the belts from slipping the pulleys have been covered with some composition, preferably felt, which tends to hold the belts in place. This method has proved very unsatisfactory, however, and does not relieve the belts from the destructive effect of the oil.

By my invention the belts are kept in their original dry state, thus doing away with the evils arising from the saturation of the belts with oil. The strain upon the bearings may also be reduced to a minimum by allowing the belts to sag.

My invention will be more readily understood by reference to the accompanying drawings, in which—

Figure 1:
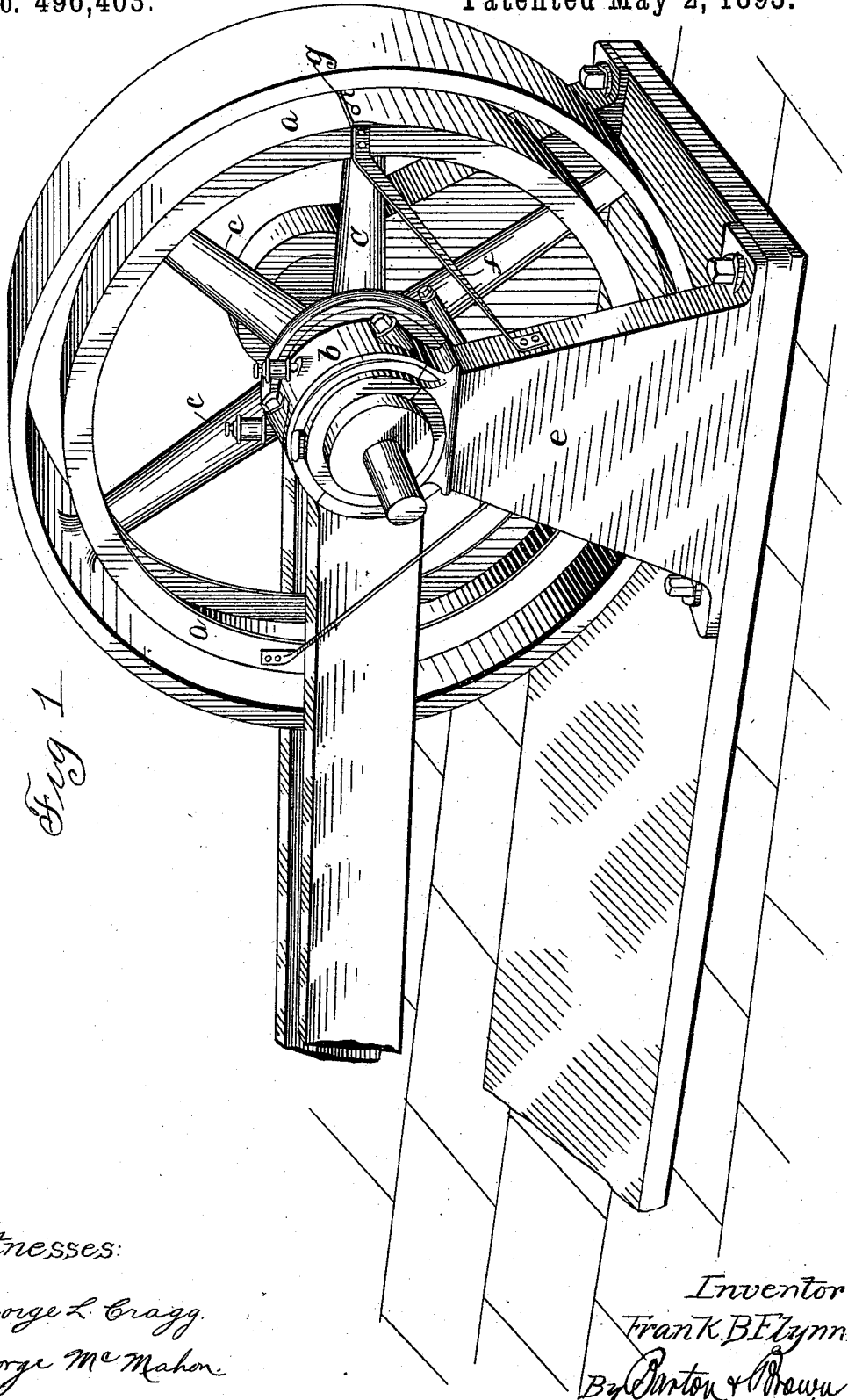
Figure 2:
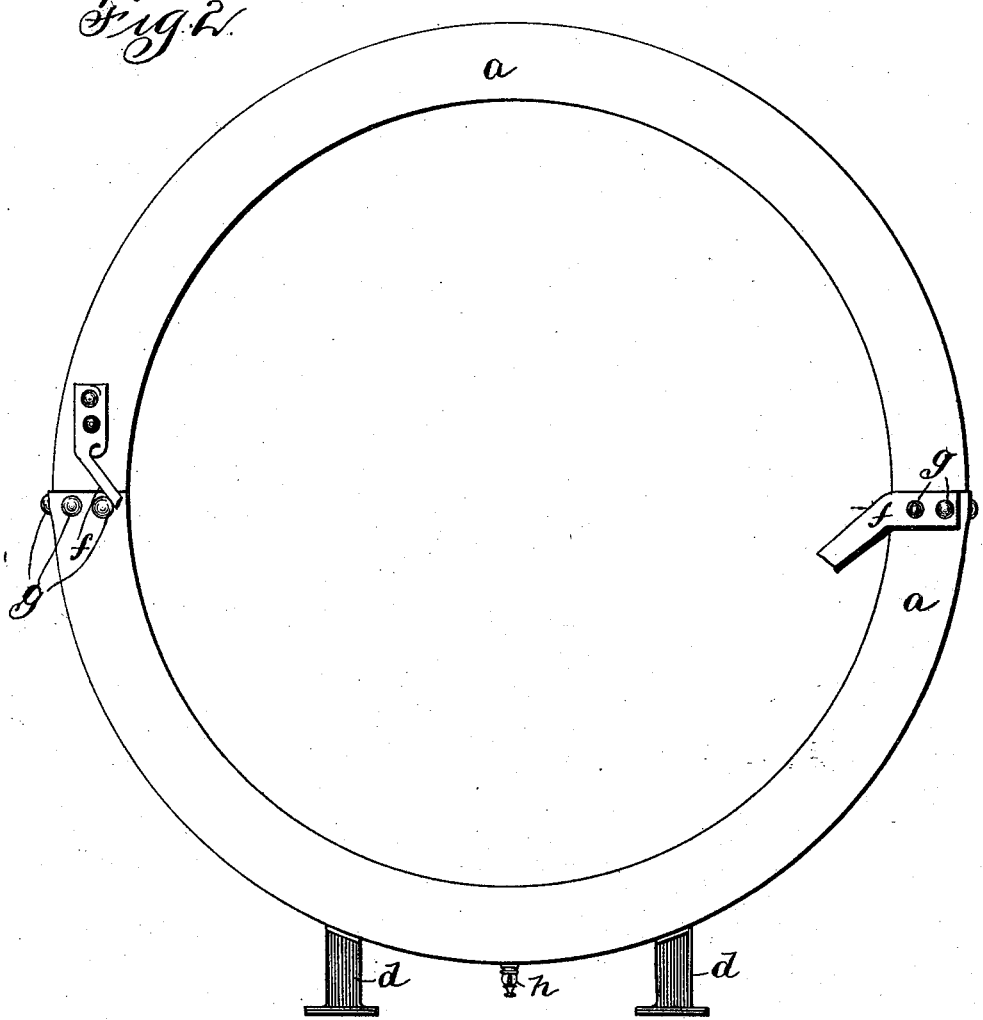

Figure 1 is a perspective view of a driving wheel with the pan of my invention in place. Fig. 2 is a front elevation of said pan.

Like parts are indicated by similar letters of reference in both views.

The pan $a$ is preferably circular in shape and is mounted between the bearing $b$ and spokes $c$ upon L irons $d\,d$ and securely braced to the standard $e$ by braces $f\,f$. The L irons $d\,d$ may be secured to the floor or to the base plate of the engine, the pan merely resting upon their properly shaped upper ends, or the pan may be secured to the upper ends by rivets or in any preferred manner.

I have shown in the drawings but one pan. Another may, if necessary, be mounted in a similar way on the other side of the spokes $c$.

I preferably make the pan a complete circle, but it is obvious that a small portion of the circular pan may be omitted without departing from my invention.

The pan is made preferably of galvanized iron, but other sheet metal may be used, and in two sections for convenience in placing it about the bearings. The number of sections, however, is not an essential feature of my invention, as the pan may be made of any desired number of sections. These sections are shown as riveted together at $g\,g$.

I provide a drip cock $h$ to draw off the accumulated oil, which descends by gravity to the lowest portion of the pan. The oil from the lubricated parts which would otherwise work harm and be wasted is saved by this pan. The oil which would otherwise be required to lubricate the bearings as the strain upon them is increased by increasing the tension of the slippery belts, is saved.

The location of the pan, as shown, entirely surrounding the bearing in a plane parallel with the plane of rotation of the pulley, serves not only to catch such oil as drips from the bearing, but also the oil which is thrown off from the bearing by centrifugal force, and as the pan lies partially within the rim of the wheel and extends slightly outside the rim, all the dripping and flying oil which could reach the belt is caught and saved.

While I have shown the device as applied to the driving pulley of a high speed engine, it will be seen readily that it is equally applicable to other similar situations, as for instance the pulleys of shafting and dynamo engines.

Having thus described my invention, what I claim as new, and desire to secure by Letters Patent, is—

1. A pan $a$ mounted upon L irons $d\,d$ and braced to standard $e$ by braces $f\,f$, said pan entirely encircling the lubricated parts and adapted to catch the oil which drops or is thrown therefrom, substantially as and for the purpose specified.

2. A pan for catching oil adapted to be mounted between the rim of a pulley and the lubricated parts, and completely encircling, or nearly completely encircling, the lubricated parts said pan lying partially within the rim of the pulley; whereby the oil which falls or is thrown from said lubricated parts is caught and saved, substantially as shown and described.

In witness whereof I hereunto subscribe my name this 14th day of November, A. D. 1892.

FRANK B. FLYNN.

Witnesses:
GEORGE W. MCMAHON,
GEORGE L. CRAGG.